United States Patent Office 3,428,069
Patented Feb. 18, 1969

3,428,069
POSITION CONTROLLING MECHANISMS
Denis William Undery, Sawbridgeworth, England, assignor to Associated Electrical Industries Limited, London, England, a British company
Filed Jan. 26, 1967, Ser. No. 611,900
U.S. Cl. 137—85     9 Claims
Int. Cl. F15b 9/12, 13/16

ABSTRACT OF THE DISCLOSURE

A valve positioner including a pneumatic relay has a mechanism for controlling a nozzle flapper of the relay. The mechanism comprises a structural unit having two arms and a cylindrical deflection part lying on mutually perpendicular axes which intersect at a point. The unit is pivotally mounted adjacent this point and is engaged by a pneumatic bellows at the end of one arm and by a feedback cam of the end of the other. An input signal representative of a desired valve position is applied to the bellows and a feedback signal representative of the actual valve position is applied to the feedback cam. A follower member engages the surface of the cylindrical part and is connected directly to the nozzle flapper. Thus the nozzle flapper is moved in response to the input and feedback signals such that the pneumatic relay controls the air pressure supplied to the valve to position it in accordance with the input signal to the bellows.

Background of the invention

This invention relates to mechanical arrangements for controlling the position of a first movable member by the combined displacements of second and third movable members.

Such arrangements can for example be used with one of the said displacements in response to an input signal and the other in response to a feedback signal derived from an operation caused by the first movable member as a result of the input signal. The arrangement then finds application in pneumatic valve-positioning systems of the kind which utilise air as the medium for applying an input signal as well as the medium for positioning a valve, and which have a mechanical system coupled to the valve for providing a displacement feedback signal, the input and feedback signals jointly controlling the position of a so-called flapper which by movement towards and away from the outlet of an air nozzle controls the nozzle back pressure and thereby the pressure applied to position the valve.

An object of the present invention is to provide a simple effective mechanical arrangement for controlling the position of a movable member by the combined movements of second and third movable members, such an arrangement being particularly suitable for use in a valve positioning system of the kind referred to.

Summary of the invention

According to the present invention a mechanism for controlling the position of a first movable member by the combined displacements of second and third movable members comprises a structural unit having a cylindrical surfaced deflection part, a fixed pivot pivotally mounting said unit at a first position thereon, two movable actuating members engaging the unit at second and third positions respectively for tilting the unit about the pivot, and a follower member constituting said first movable member and engaging the cylindrical surface, the three positions being triangularly disposed and said part having its cylindrical surface centred on an axis which is transverse to the plane defined by said positions and which passes through the plane adjacent the first position, whereby movement of the actuating members to tilt the unit will by deflection of the deflection part cause a displacement of the follower member, such displacement having vector components of magnitudes according to the displacements of the unit at said second and third positions by the actuating members and in magnitude ratio according to the angular position about the cylindrical surface of engagement thereof by the follower member.

Such a mechanism can readily be applied to a pneumatic valve-positioner, the actuating members being respectively constituted by or coupled to an air bellows and a cam linked to the valve, and the follower member being coupled to a nozzle flapper for controlling a pneumatic relay.

Preferably the position of engagement between the follower member and the cylindrical surface of the deflection part is angularly adjustable both for varying the ratio of the magnitudes of the two vector components and for reversing their directions. Also by providing adjustment of the position of the follower member axially of the deflection part the resulting displacement of the follower member and thus of the nozzle flapper can be increased or decreased accordingly.

Brief description of the drawings

In order that the invention can be more easily understood reference will now be made to the accompanying drawings which show an application of the invention to controlling the position of a nozzle flapper of a pneumatic relay for positioning a valve.

Description of the preferred embodiment

Figure 1:
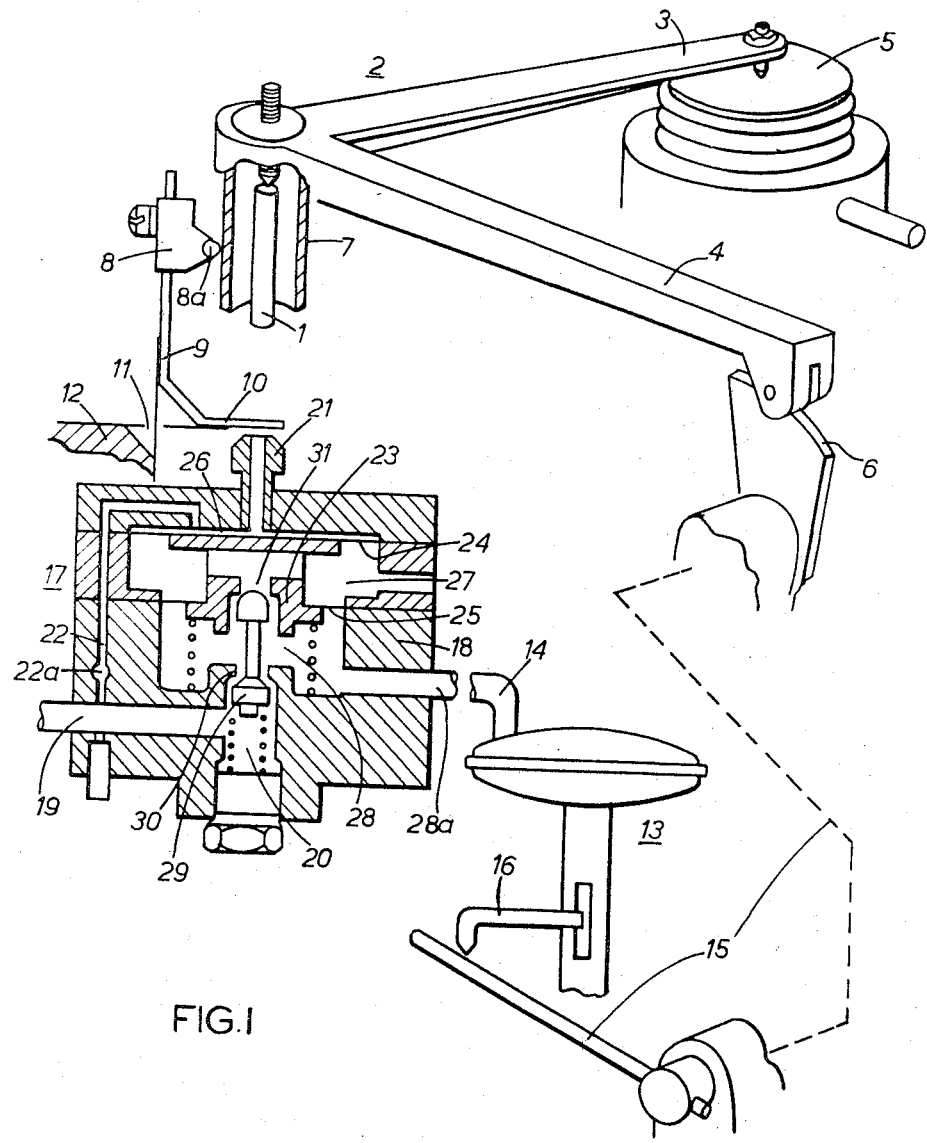
FIG. 1 shows diagrammatically a mechanism arranged to control a pneumatic relay for positioning a valve.

Referring to FIG. 1 a fixed pivot 1 supports a structural unit 2 having two arms 3 and 4 respectively extending to and supported by a pressure responsive bellows 5 of well known form and a rotatable cam 6. A deflection part in the form of a cylinder 7 depends from the unit 2 at right angles to both arms 3 and 4 and a pad 8 adjustable along an arm 9 of a nozzle flapper 10 is urged with its edge 8a tangentially against the cylinder by the action of a resilient mounting arrangement 11 by which the flapper is supported on an adjustment ring 12. This ring can be rotated such that pad 8 can assume any angular position about the cylinder 7. Preferably the edge 8a is of P.T.F.E. or other low friction material, and can conveniently be provided in the form of a cylindrical member seated in a concave recess along the edge of member 8.

A pneumatic valve 13 whose position can be varied by changing the air pressure at the valve input 14 has a mechanical linkage 15 to convert linear motion of an arm 16 connected to a plunger in the valve into angular motion of the cam 6.

A nonbelted pneumatic relay designated generally by the numeral 17 comprises a casing 18 having an inlet air supply port 19 communicating with inlet chamber 20 and with an adjustable nozzle 21 via a duct 22 having a restriction 22a. A spring-loaded movable member 23 is supported within the casing 18 by air-tight resilient diaphragms 24 and 25 thereby defining within the casing a nozzle chamber 26, exhaust chamber 27 and output chamber 28. A double headed spring-loaded valve member 29 controls access openings 30 and 31 between respectively the input chamber 20 and output chamber 28, and the output chamber 28 and exhaust chamber 27.

The output chamber 28 is connected via the outlet 28a to the valve input 14 and the relay 17 is supplied with air under pressure via supply port 19. Bellows 5 is supplied with air at a controlled pressure representative of the dtsired valve position.

Figure 2:
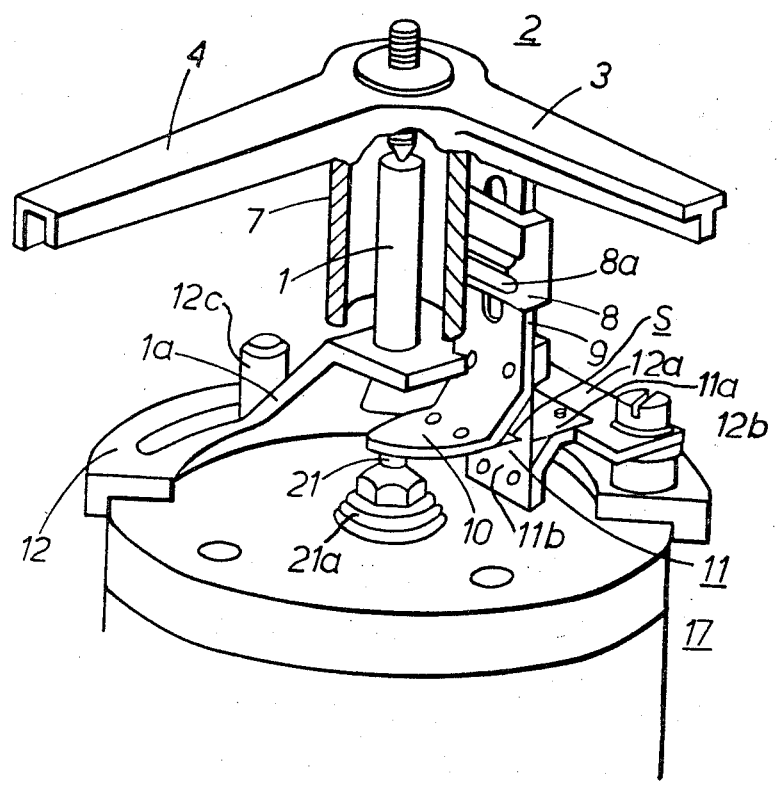
FIG. 2 shows in perspective the pneumatic relay and fixed pivot mounting arrangement of the mechanism.

Referring now to FIG. 2 a fixed pivot mounting arrangement is shown more clearly. The arrangemtnt is otherwise substantially the same as that shown in FIG. 1 and similar parts are designated with like numerals. The fixed pivot 1 is supported on a spider-like pedestal 1a of a supporting adjustment ring 12. The pivot is axially in line above the nozzle 21 so that on rotation of the ring 12 the pivot point will remain in line. The ring 12 is rotatable about a ring-like nozzle mounting 21a which is secured to or integral with the casing 18 of the pneumatic relay. The flapper 10 and arm 9 constituted by one member are resiliently mounted at 11 by cross springs, constituted by two spring members 11a and 11b secured to a mounting platform 12a and crossing each other, one or both of the members being provided with a slot s to receive the other member at the position of crossing. The platform 12a is secured by screws such as 12b to the adjustment ring 12. A clamping member 12c clamps the ring 12 to the relay 17 in any desired angular position.

Figure 3:
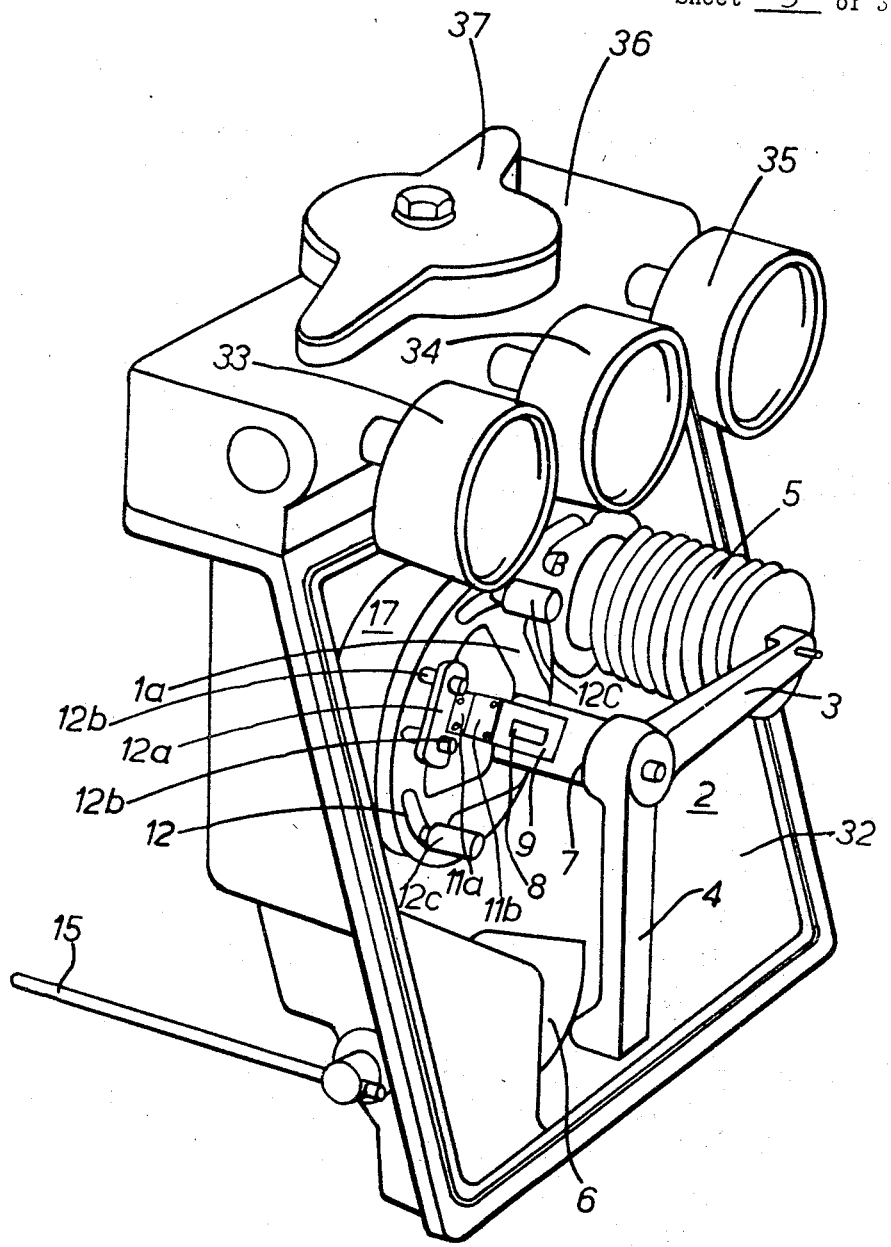
FIG. 3 shows in perspective a practical layout of FIG. 1 mounted on a casing, with the valve not shown.

FIG. 3 shows a practical arrangement of the structural unit 2, bellows 5 feedback cam 6 and pneumatic relay 17 mounted on a casing 32 for controlling the position of a valve. Parts of FIG. 3 which correspond to parts of FIGS. 1 and 2 are given like numerals. Three pressure gauges 33 and 34 and 35 are shown mounted on a by-pass manifold 36 secured to the casing and arranged to indicate respectively the pressure applied to the valve, the supply pressure, and the input signal pressure to the bellows. The by-pass manifold 36 is provided with a by-pass switch lever 37 which is operable to disconnect the pneumatic relay and connect the input signal pressure directly to the valve input.

In operation and in the absence of any change of air pressure to the bellows, the system will attain a state of equilibrium with valve member 29 closing the accesses 30 and 31 cutting off the air supply to the valve, thus maintaining the valve in a required position.

If it is desired to alter the valve position the pressure of the air supply to the bellows is changed constituting an input signal, either increased or decreased. If the pressure is increased then with the position of the follower member 9 as shown the resulting movement of the bellows and the arm 3 will cause flapper 10 to increase its restriction on the discharge of air from the nozzle 21. Thus the back pressure of the air in the nozzle chamber 26 supplied via duct 22 and restriction 22a will increase causing member 23 to move valve member 29 to open access 30. Air from the supply is therefore allowed to exert further pressure at the valve input 14 thereby repositioning the valve until the movement of the plunger 16 transmitted to the arm 4 via the linkage 15 and the cam 6 causes the nozzle flapper to move away from the nozzle. The pressure in the nozzle chamber therefore decreases since restriction 22a is arranged to restrict the flow of air to a greater extent than the nozzle. Member 23 therefore resumes its original position closing access 30 and maintaining access 31 closed.

When the input signal air pressure to the bellows is decreased the nozzle flapper is caused to move away from the nozzle thus decreasing the back pressure in the nozzle chamber allowing the spring loading to move member 23 away from the valve member 29 causing the access 31 to open and allowing air from the valve to escape via the exhaust chamber. The valve repositions itself under the action of, for example, a spring (not shown) until the movement transmitted to the arm 4 causes the nozzle flapper to move back towards the nozzle to allow the pressure in the nozzle chamber to increase, thereby restoring member 23 to its original equilibrium position.

A typical supply pressure to the relay would be 20 p.s.i.

Various adjustments are provided for setting up the system. These include screw threaded pivot members for aligning the unit 2, adjustment for increasing or reducing the restriction 22a, and angular adjustment of the cam 6 in relation to the linkage 15.

The pad 8 can be adjusted to various positions along the arm 9 and is effective as a gain control, the lower the position the greater the gain and the higher the position the lower the gain.

Nozzle 21 can also be adjusted by screwing it into or out of the casing 18.

It will be observed that in the present application the possibility of complete angular rotation of the combined follower member and flapper around the cylinder 7 allows the system to be used with a valve acting in the reverse mode without any modifications to the system.

I claim:
1. A mechanism for controlling the position of a first movable member by the combined displacements of second and third movable members, comprising:
   (a) a structural unit having a cylindrically surfaced deflection part,
   (b) a fixed pivot pivotally mounting said unit at a first position thereon,
   (c) two movable actuating members engaging the unit at second and third positions respectively for tilting the unit about the pivot,
   (d) a follower member constituting said first movable member engaging the cylindrical surface,
   (e) the three positions being triangularly disposed, and
   (f) said part having its cylindrical surface centred on an axis which is transverse to the plane defined by said positions and which passes through the plane adjacent the first position, whereby movement of the actuating members to tilt the unit will by deflection of the deflection part cause a displacement of the follower member, such displacement having vector components of magnitudes according to the displacements of the unit at said second and third positions by the actuating members and in magnitude ratio according to the angular position about the cylindrical surface of engagement thereof by the follower member.

2. A mechanism as claimed in claim 1 wherein the follower member is spring-biased against the cylindrical surface.

3. A mechanism as claimed in claim 1 wherein the follower member is adjustably mounted in a manner permitting adjustment of the position of its engagement with said surface longitudinally and/or circumferentially with respect to said axis.

4. A mechanism as claimed in claim 1 in combination with a pneumatic relay having an input for receiving compressed air from an air supply, an output for supplying air at a controlled pressure to a pneumatically operable valve, and a pressure controlling nozzle with a flapper movable relative thereto and connected to the follower member of the mechanism, one of the actuating members being arranged for actuation by a control input signal representative of a desired position of said valve and the other for actuation by a feedback signal representative of the actual position of said valve, the control mechanism being responsive to said signals in such manner as to maintain the valve in the desired position by control of the flapper position and thereby of the output pressure from said relay to the valve.

5. The combination of claim 4 wherein the said one actuating member is constituted by a pneumatic bellows.

6. The combination of claim 4 wherein the said other actuating member is constituted by a cam adapted to be mechanically linked with the valve.

7. The combination of claim 4 including a rotatable support structure mounted on said pneumatic relay for rotation about an axis concentric with said nozzle, which structure supports said fixed pivot coaxially therewith and also supports said nozzle flapper.

8. The combination of claim 7 including spring support means joining the flapper to the rotatable support structure and biasing the follower member against the surface of said deflection part, the flapper having a portion extending substantially parallel to said axis, and the follower member being secured to said portion in longitudinally adjustable fashion.

9. The combination of claim 8 wherein the deflection part is of hollow cylindrical form, the fixed pivot being situated within this part and the said cylindrical surface being on the outside thereof.

References Cited

UNITED STATES PATENTS

| 2,842,147 | 7/1958 | Markson | 137—85 |
| 2,984,260 | 5/1961 | Hanssen | 137—85 XR |
| 3,211,165 | 10/1965 | Jansson | 137—86 |
| 3,279,490 | 10/1966 | Nishihara et al. | 137—85 |

JOHN PETRAKES, *Primary Examiner.*